United States Patent
Bruckhaus

Patent Number: 6,052,492
Date of Patent: Apr. 18, 2000

[54] SYSTEM AND METHOD FOR AUTOMATICALLY GENERATING AN IMAGE TO REPRESENT A VIDEO SEQUENCE

[75] Inventor: Tilmann Bruckhaus, Sunnyvale, Calif.

[73] Assignee: Sun Microsystems, Inc., Palo Alto, Calif.

[21] Appl. No.: 08/987,327

[22] Filed: Dec. 9, 1997

[51] Int. Cl.[7] .................................................. G06K 9/36
[52] U.S. Cl. ......................... 382/284; 382/305; 345/328
[58] Field of Search ................................... 382/103, 217, 382/107, 309, 236, 284, 305, 154; 348/722, 7, 700; 345/328; 707/1

[56] References Cited

U.S. PATENT DOCUMENTS

| | | | |
|---|---|---|---|
| 5,485,611 | 1/1996 | Astle | 707/1 |
| 5,521,841 | 5/1996 | Arman et al. | 345/328 |
| 5,768,415 | 6/1998 | Jagadish et al. | 382/154 |
| 5,778,108 | 7/1998 | Coleman, Jr. | 382/305 |
| 5,802,361 | 9/1998 | Wang et al. | 382/217 |
| 5,867,584 | 2/1999 | Hu et al. | 382/103 |
| 5,963,203 | 10/1999 | Goldberg et al. | 345/328 |

FOREIGN PATENT DOCUMENTS 0 472 806 A2   3/1992   European Pat. Off. .......... H04N 5/14

*Primary Examiner*—Leo H. Boudreau
*Assistant Examiner*—Ishrat Sherali
*Attorney, Agent, or Firm*—Graham & James LLP

[57] ABSTRACT

A system automatically generates a representative image to represent a video sequence of a video program, and facilitates editing and manipulating of the video program. The system comprises receiving means (such as a frame selector or a unit extractor) for receiving a frame having at least one unit from a sequence of frames, resolving means (such as a unit extractor) for resolving one of the at least one unit, and generating means (such as an image engine) for generating an image representative of the sequence based on the unit. The system may further comprise a sequence divider for dividing the video program into multiple video sequences, and a frame selector for selecting the first sequence from the multiple sequences. The system may also comprise a unit distinction engine for determining distinct units from the units resolved by the resolving means, a unit predominance engine for defining predominance of each of the distinct units, and a unit representation engine for determining the distinct units which most uniquely represent the first video sequence. The resolving means preferably generates the representative image based on the distinct units determined by the unit representation engine to represent the first video sequence most uniquely. The resolving means may include an enhancement module for adding artwork or other enhancements to the representative image.

14 Claims, 9 Drawing Sheets

SYSTEM AND METHOD FOR AUTOMATICALLY GENERATING AN IMAGE TO REPRESENT A VIDEO SEQUENCE

BACKGROUND OF THE INVENTION

1. Field of the Invention

This invention relates generally to computers and video sequences, and more particularly provides a system and method for automatically generating a still or moving image to represent a video sequence.

2. Description of the Background Art

To edit or manipulate a video program (i.e., a set of video sequences such as in a news broadcast), it is often necessary to edit or manipulate video sequences or scenes comprising the video program. To manipulate or edit the video program effectively, the user should first comprehend the content and context of each video sequence. Accordingly, the user must identify and recognize separate video sequences. For example, a video program of a news broadcast may comprise a world news sequence, a local news sequence, a national crime sequence, commercial, etc. Should a user wish to edit the video program, the user must first review the entire program to gather content and context information for each sequence and to identify the start and stop time of each sequence. Reviewing an entire program and searching for the start and stop time consumes significant time and effort.

Further, the user's notes often provide the only record of the content and context of the video sequences in the video program. Thus, the user must take significant time and effort to assure that no mistakes have been made. Further, the user must take significant time and effort to record identifying information adequately for each sequence. Otherwise, should the user fail to properly record identifying information or should the user forget what the notes meant, the user must re-review the video program or at least the particular sequence.

Another shortcoming of prior art is that a user cannot easily identify multiple sequences in parallel. Viewing a sequence requires concentration on that sequence. When viewing multiple sequences in parallel, the user must split attention from one sequence to another. However, while observing one sequence, the user will miss parts of the other sequences, which may lead to errors and additional wasted time and effort.

Therefore, what is needed is a device and technique for recalling the context and content of a video sequence quickly and efficiently, and which avoids the attendant shortcomings of notes. Moreover, simultaneous viewing must be facilitated.

SUMMARY OF THE INVENTION

A preferred embodiment of the present invention provides a system for automatically generating a representative image to represent a video sequence of a video program, and to facilitate editing and manipulating of the video program. The system divides a video program into sequences, reviews the frames of each sequence, and extracts units of video information that best represent each video sequence. The system uses the best images of each sequence to generate a representative image for the sequence.

The system comprises a frame selector, a unit extractor and an image engine. The frame selector receives a frame having at least one unit from a sequence of frames. The unit extractor extracts or resolves the at least one unit. The image engine generates an image representative of the sequence based on the unit. The system may further comprise a sequence divider which divides a video program into multiple video sequences, and a frame selector which selects a particular sequence from the multiple sequences and a set of representative frames from each sequence. The system may also comprise a unit distinction engine that determines distinct units from the units extracted by the unit extractor, a unit predominance engine that computes predominance for each of the distinct units, and a unit representation engine that determines the best distinct units which represent the particular video sequence most uniquely. The image engine preferably generates the representative image based on the best distinct units. The image engine may include an enhancement module for adding artwork or other enhancements to the representative image.

Another embodiment of the present invention provides a method for automatically generating an image to represent a video sequence, and to facilitate editing and manipulating the video program. The method comprises the steps of receiving from a sequence of frames a first frame having a first unit, resolving the first unit, and generating an image representative of the sequence based on the first unit.

The system and method of the present invention may advantageously generate representative images to represent video sequences (or portions of video sequences), and thus enable a user to comprehend content and context of a video program quickly and easily. The user need not preview or take notes to represent the sequences. Further, the system and method of the present invention enable a user to view a large array of representative images in parallel and in chronological order, thereby enabling a user to gather content and context information even more quickly and easily. Still further, the system and method of the present invention facilitate the editing and manipulation of video sequences comprising the video program. That is, the user can manipulate a representative image and thereby manipulate the corresponding video sequence.

For example, a video editor for the staff of a news agency may use the system and method of the present invention to identify specific news footage, to discard unwanted news footage, and to forward significant news footage to a news show. An archiver may use the system and method to label and index various sequences. A military intelligence officer may use the system and method to identify sequences for further analysis. A criminal investigator may use the system and method to identify sequences shot at a crime scene that deal with specific objects or individuals. An astronomer may use the system and method to identify video sequences that show specific stellar events of interest.

Still other embodiments of the present invention will become readily apparent to those skilled in the art from the following detailed description, wherein is shown and described only the embodiments of the invention by way of illustration of the best modes contemplated for carrying out the invention. As will be realized, the invention is capable of other and different embodiments and several of its details are capable of modification in various obvious respects, all without departing from the spirit and scope of the present invention. Accordingly, the drawings and detailed description are to be regarded as illustrative in nature and not as restrictive.

DETAILED DESCRIPTION OF THE PREFERRED EMBODIMENT

Figure 1:
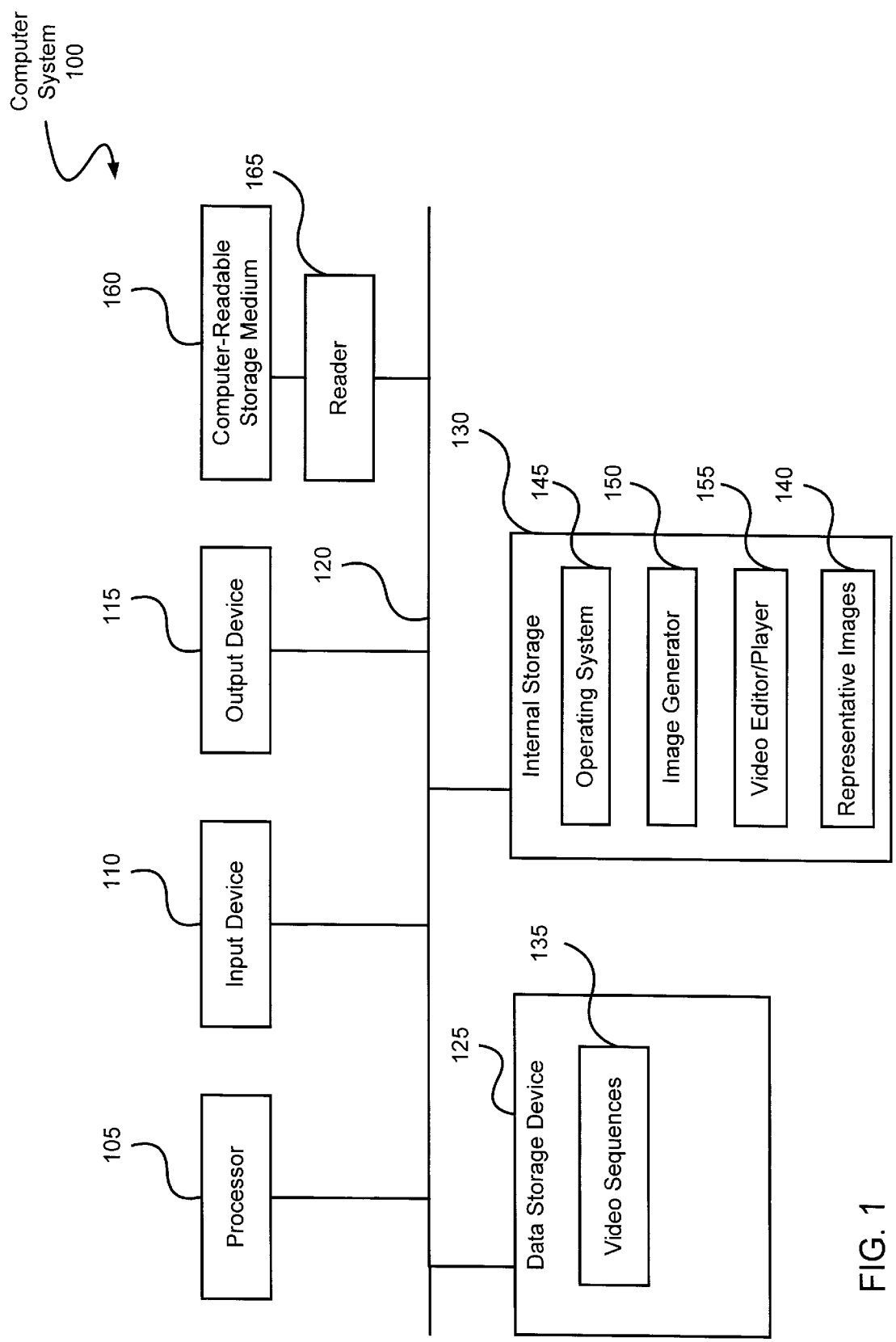
FIG. 1 is a block diagram illustrating a computer system, in accordance with the present invention.

FIG. 1 is a block diagram illustrating a computer system 100, in accordance with the present invention. The computer system 100 includes a processor 105, such as a SPARC™ processor available from Sun Microsystems, Inc. of Mountain View, Calif., an Intel Pentium® microprocessor or a Motorola Power PC® microprocessor, coupled to a signal bus 120. The computer system 100 further includes an input device 110 such as a keyboard or mouse, an output device 115 such as a Cathode Ray Tube (CRT) display, a data storage device 125 such as a magnetic disk, and an internal storage 130 such as Random-Access Memory (RAM), each coupled to the signal bus 120. The external storage 125 stores video sequences 135 in the form of a full-motion video program, and images 140 representing the video sequences 135. The computer system further includes a reader 165 coupled to the signal bus 120 for reading data from a computer-readable storage medium 160.

An operating system 145 controls processing by processor 105, and is typically stored in internal storage 130 (as illustrated) for execution by processor 105. An image generator 150 automatically generates a representative image 140 corresponding to a video sequence of video sequences 135. Image generator 150 also may be stored in internal storage 130 (as illustrated) for execution by processor 105. A video editor/player 155 enables manipulation, e.g., deletion, re-ordering, archiving, etc., of representative images 140 and performance of selected sequences. Video editor/player 155 is also stored in internal storage 130.

It will be appreciated that the video sequences 135, representative images 140, operating system 145, image generator 150, video editor/player 155 and other information may be stored on the computer-readable storage medium 160 and loaded via the reader 165 to the data storage device 125 or to internal storage 130. Alternatively, the video sequences 135, representative images 140, operating system 145, image generator 150, video editor/player 155 and other information may be stored on the data storage device 125 and loaded into internal storage 130 for execution. It will be further appreciated that one of ordinary skill in the art will recognize that the computer system 100 may include other devices, such as network connections for transferring information across a hardware channel, the Internet or an intranet, additional memory, additional processors, LANs, etc.

Figure 2:
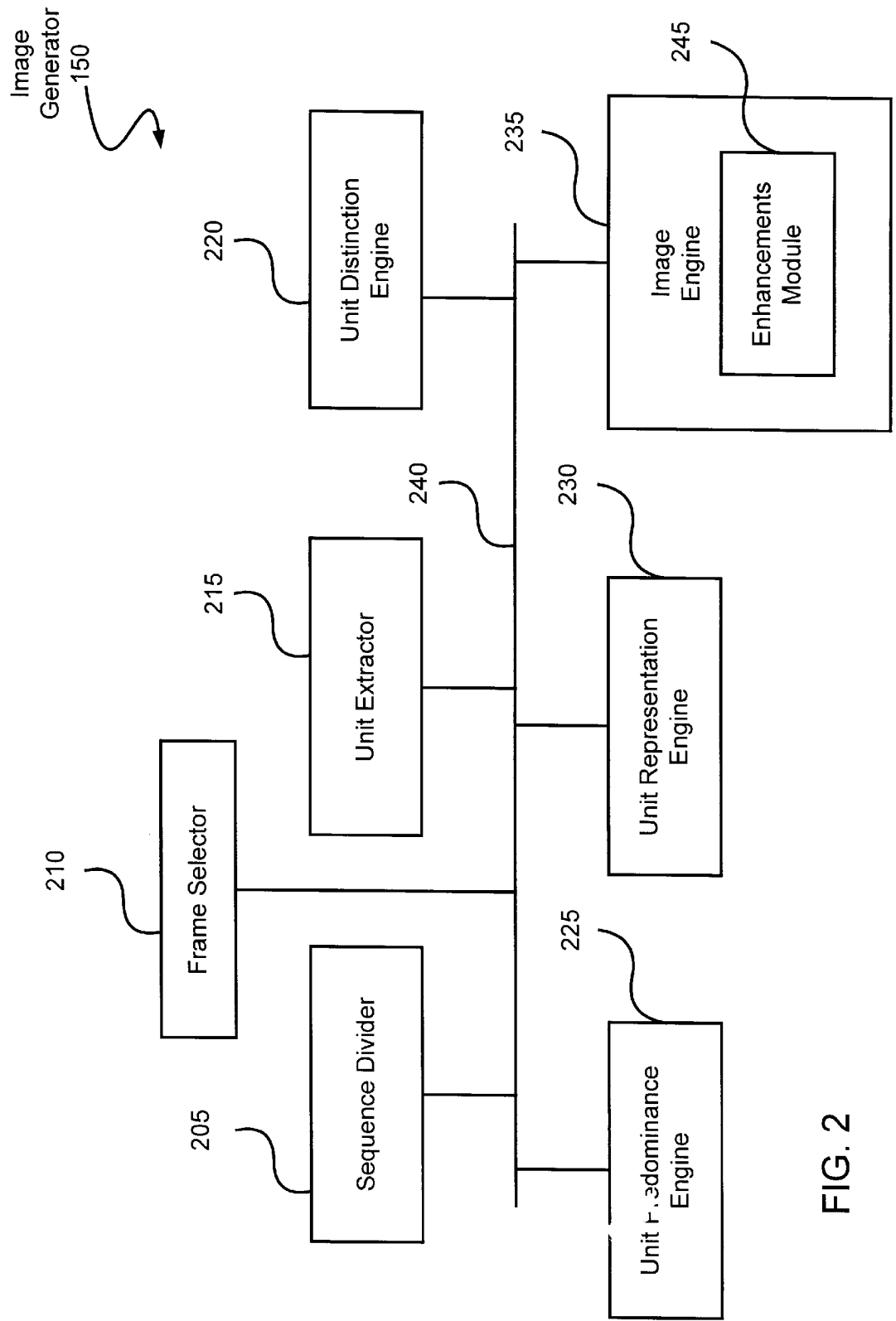
FIG. 2 is a block diagram illustrating details of the image generator of FIG. 1.

FIG. 2 is a block diagram illustrating details of the image generator 150. Image generator 150 includes a sequence divider 205, a frame selector 210, a unit extractor 215, a unit distinction engine 220, a unit predominance engine 225, a unit representation engine 230 and an image engine 235, each coupled to a communications channel 240. The image engine 235 includes an enhancements module 245. Although one of ordinary skill in the art knows that software routines/threads communicate via techniques such as memory sharing, system calls, etc., the elements are illustrated and described as being connected via a bus-like structure (i.e., communications channel 240) for simplicity.

The sequence divider 205 is preferably a software module for dividing a video program into video sequences 135. For example, a news broadcast video program may include a video sequence 135 providing sports updates, a video sequence 135 on the weather, a video sequence 135 on world news, a video sequence 135 on local news, etc. The sequence divider 205 examines the video program for appropriate sequence division and, for example, creates an index representing the start or end of each sequence 135. Sequence division may be performed by recognizing noise found between sequences 135, evaluating content (e.g., screening for words commonly used as sequence segues), recognizing background changes, prompting for user input, reviewing predefined index tables, etc.

The frame selector 210 automatically selects an untested video sequence 135 and an untested frame for examination. For example, the frame selector 210 may select in order the first video sequence 135, and may select every $30^{th}$ frame. It will be appreciated that, since the conventional video player performs thirty frames per second, every frame need not be selected. Depending on the specific application or subject material, selecting every frame may lead to wasted processor and user time.

The unit extractor 215 uses pattern recognition (including contour recognition) and image analysis to extract, i.e., resolve, units from the frame selected by the frame selector 210. A unit is defined as an integral set of pixels representing a single physical object in the frame. For example, using pattern recognition, the unit extractor 215 may identify a grouping of orange-colored pixels (which may also have a similar contrast, brightness, etc.) as a single unit (e.g., a basketball). The unit extractor 215 preferably extracts all units possible from the selected frame. It will be appreciated that the unit extractor 215 may also use pattern recognition as described, for example, in "Fundamentals of Digital Image Processing" by Anil K. Jain (1989) and in "Machine Vision" by Ramesh Jain, Rangachar Kasturi and Brian Schunck (1995), which are hereby incorporated by reference.

It will be appreciated that the unit extractor 215 may examine other frames in a video sequence 135 to resolve particular units. That is, if the unit extractor 215 learns that the grouping of orange-colored pixels remain together in previous or subsequent frames, the unit extractor 215 may resolve integral units more accurately and efficiently. Further, the unit extractor 210 may examine units in previous or subsequent frames to resolve the greatest possible unit. For example, a shirt includes a collar, arms, buttons, cuffs, etc. The unit extractor 210 may initially determine that the collar is a unique unit, each arm is a unique unit, each button is a unique unit, each cuff is a unique unit, etc. However, by examining the units in the previous and subsequent frames, the unit extractor 210 can recognize that the shirt as a whole may be deemed an integral unit.

The unit distinction engine 220 reviews the units located in the frames of a video sequence 135 to identify like units and distinguish unlike units. That is, a unit shown in one frame most likely has similar attributes in a subsequent frame. Accordingly, the unit distinction engine 220 looks for common pixel groupings in the frames of the selected video sequence 135, recognizes like units, and defines the like units as instances of the same unit. For example, the unit distinction engine 220 may determine that a "basketball #1" unit in a first selected frame is similar to a "basketball #2" unit in a subsequent selected frame, and thus defines these basketballs as two instances of a single basketball unit. It will be appreciated that the unit distinction engine 220 may use unit distinction techniques as described, for example, in "Fundamentals of Digital Image Processing" and in "Machine Vision," which have been incorporated by reference above.

The unit predominance engine 225 determines the predominant units in the frames of a video sequence 135. Determining predominance may include examining unit attributes including the number of instances found of each particular unit, unit size relative to frame size, unit brightness, prominence or peculiarity of the unit relative to frame background, the amount of apparent unit motion across frames, the change in unit size across frames, unit shape, etc. The unit predominance engine 225 computes a predominance factor for each unit. For example, a basketball which is visible in substantially all frames may have a greater predominance factor than a wall advertisement which is visible in only a few frames. Further, the basket ball may have the same predominance factor as the scoreboard, which, although visible in fewer frames, has greater visibility, size, prominence, etc.

The unit representation engine 230 examines units having a high predominance factor, and based on this information selects the units that best represent the video sequence 135. The unit representation engine 230 may review frames in previous and subsequent video sequences 135 to determine whether a unit scoring a high predominance factor is unique to the current video sequence 135. For example, a particular newscaster scoring a high predominance factor in several sequential video sequences 135 does not effectively represent the current video sequence 135 with respect to the specific complete video program containing the sequences. The unit representation engine 230 eliminates units providing poor sequence representation, and selects the units providing best sequence representation.

Alternatively, to select representative units, the unit representation engine 230 may prompt for user input. The unit representation engine 230 may enable the user to select from all the units distinguished by the unit distinction engine 220, to select from units selected by the predominance engine 225, or to select a frame and to select one of the units in the frame. Other ways of selecting representative units may be used.

The image engine 235 uses the selected units to generate a representative image 140 for a video sequence 135. The representative image 140 may include a still image, a "moving" image or a combined still and moving image. For example, if the best representative units include a basketball and a scoreboard, the image engine 235 may generate a still image of the basketball superimposed over the scoreboard. The enhancements module 245 of the image engine 235 enhances the generated image, for example, by adding additional descriptive artwork to the generated image. For example, if the basketball appears to move across the frames of a sequence from the left side to the right side, then the enhancements module 245 may place lines representing air movement to the left of the basketball. The representative image 140 will thus be a still image of the scoreboard having a superimposed basketball with air-defining lines on the left side. Alternatively, to represent the movement of the basketball, the enhancements module 245 may create a thumbnail video image of a basketball moving from the left to the right. The representative image will thus be the scoreboard having a superimposed moving basketball thumbnail video image.

It will be further appreciated that representative image generation can be performed on sub-sequences (which respectively may be referred to as a video sequence 135). For example, a news program may include a video sequence 135 on crime, and the crime video sequence 135 may include a sub-sequence on local crime, a sub-sequence on national crime, a sub-sequence on legal reformation, etc. A representative image 140 may be generated for each of these video sub-sequences. Further, although representative image generation is being described herein relative to integral sequences and sub-sequences, one skilled in the art will recognize that an image can be generated to represent a portion of an integral video sequence 135. For example, multiple representative images 140 can be generated to represent portions of a sub-sequence reporting local weather. Still further, it will be appreciated that a meta-representative image 140 can be generated to represent a set of representative images 140. Accordingly, the resulting representative images 140 may be referred to as "hierarchical."

Figure 3:
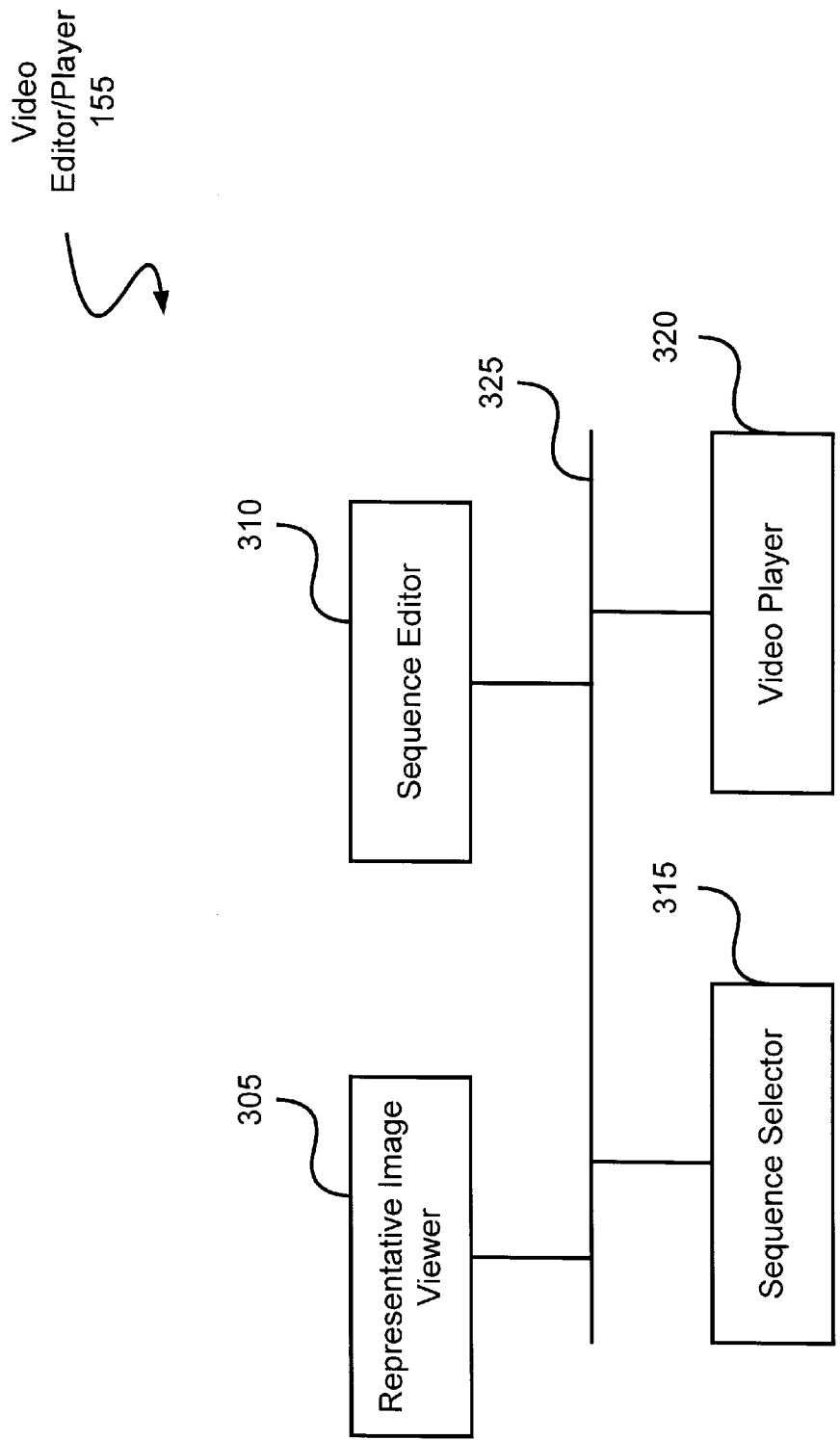
FIG. 3 is a block diagram illustrating details of the video editor of FIG. 1.

FIG. 3 is a block diagram illustrating details of the video editor/player 155 of FIG. 1. The video editor/player 155 includes a representative image viewer 305, a sequence editor 310, a sequence selector 315 and a video player 320, each coupled to a communications channel 325. Although the communications channel 325 is illustrated as a bus-like structure, one skilled in the art knows that conventional software techniques such as shared memory, system calls, etc. are typically used.

The representative image viewer 305 enables a user to view the representative images 140 generated by the image generator 150. For example, the representative image viewer 305 may display on the output device 115 the representative images 140 as an array of icons, preferably, in sequential order. For example, if a news program includes a first sequence on world news, a second sequence on local news, and a third sequence on the space program, then the representative image viewer 305 will place the world news representative image 140 first, the local news representative image 140 second, and the space program representative image 140 third. It will be appreciated that, should the representative images 140 contain representative sub-images 140 or be a member of a representative parent image 140, the representative viewer 305 may enable the user to peruse through the images using similar methods to those used when perusing through a set of software containers, windows, folders, etc. Alternatively, the representative viewer 305 may enable the user to view the images through the use of a tree-type structure. It will be further appreciated that, to provide a visual clue of the content and context of a particular video sequence 135, the representative image viewer 305 may enable the user to view the distinct units of the sequence 135 in order of predominance.

The sequence editor 310 enables a user to edit (e.g., delete, re-order, duplicate, etc.) video sequences 135 via the representative images 140. For example, the sequence editor 310 may enable the user to re-order the representative images 140, thereby re-ordering the video sequences 135, or may drag a representative image 140 into a waste basket, thereby deleting the corresponding video sequence 135.

Accordingly, the news program may be edited so that the space program video sequence 135 comes first, the local news video sequence 135 comes second, and the world news video sequence 135 comes third. The sequence editor 310 may further enable the user to edit the content of a video sequence 135 via the representative images 140. For example, the user may delete, move, etc. representative sub-images 140 within a selected video sequence 135. Alternatively, the user may select a video sequence 135 (thereby causing the sequence editor 310 to enable the selection of frames), and may select a particular frame (thereby causing the sequence editor 310 to enable modification of the selected frame).

The sequence selector 315 and video player 320 enable a user to select and perform a video sequence 135 or video sequences 135. That is, the sequence selector 315 enables the user to select video sequences 135 to perform, and the video player 320 performs the selected video sequences 135. Selection and performance of the video sequences 135 by the sequence selector 315 and the video player 320 may differ from the actual broadcast. The user can select and re-order the video sequences 135 for review before the actual broadcast. For example, the user may already have ordered the representative images 140 of a video program, but may wish to re-order the representative sub-images 140 of a particular video sequence 135. The user may select and perform the video sub-sequences 135 in different orders without compromising the order of the parent video sequences 135. The video player 320 uses the representative images 140 as a guide to retrieving and performing the video sequences 135. Namely, the video player 320 retrieves and performs the video sequence 135 corresponding to the first representative image 140, then retrieves and performs the video sequence corresponding to the second representative image 140, etc. Similarly, it will be appreciated that retrieval and performance of a video sequence 135 may be controlled according to the order of its representative sub-images 140. It will be appreciated that, as an alternative to broadcasting, one could also archive, transmit, process, etc.

Figure 4:
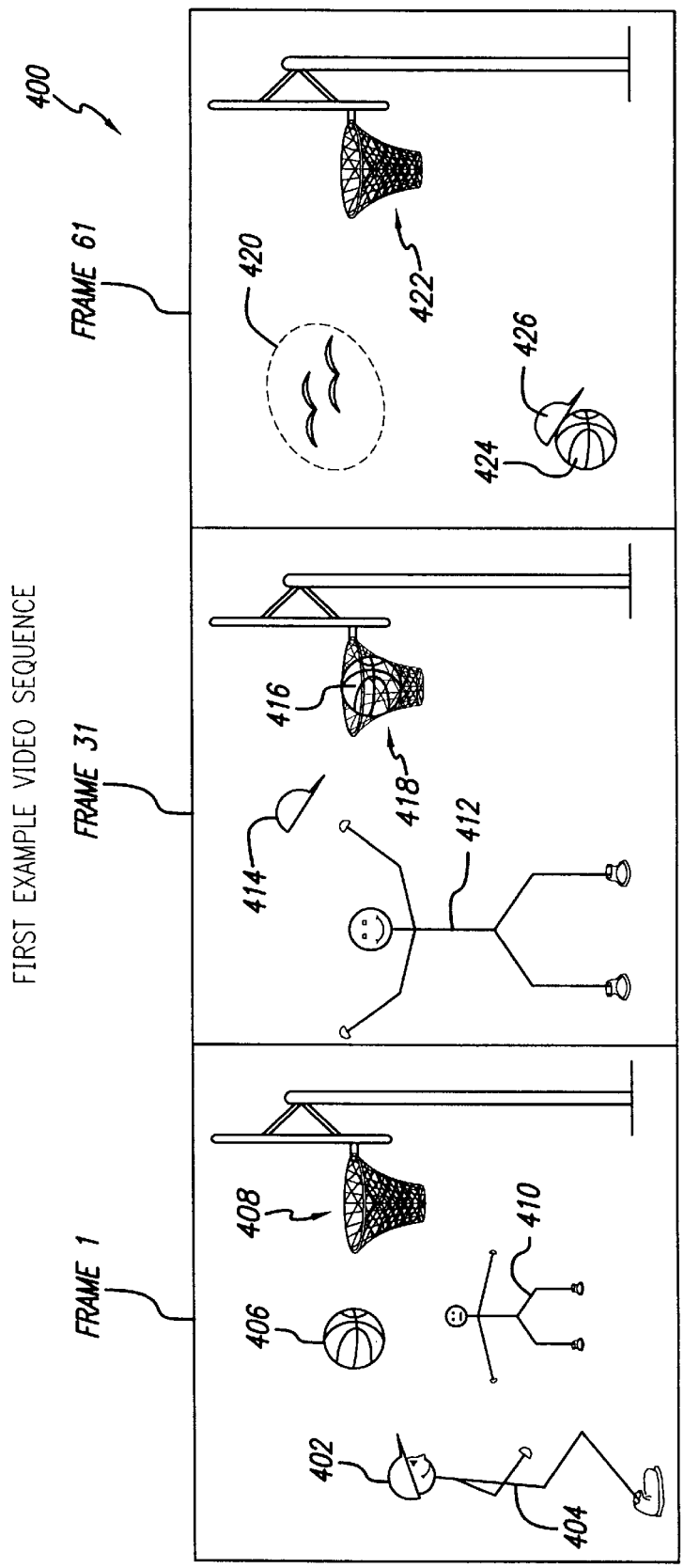
FIG. 4 illustrates a first example video sequence of FIG. 1.

FIG. 4 illustrates a first example video sequence 400 exemplifying a video sequence 135. The first example video sequence 400 includes a first frame (Frame 1), a second frame (Frame 31) and a third frame (Frame 61). Frame 1 contains a person 404 wearing a hat 402 and tossing a basketball 406 into a basket 408 while a spectator 410 watches. Frame 31 contains a person 412 having his arms raised high, a hat 414 mid-air, and a basketball 416 within the net of a basket 418. Frame 61 contains two flying birds 420, a basketball 424, a hat 426 and a basket 422.

Generating a Representative Image for the First Example Video Sequence

The frame selector 210 selects Frame 1 and, for example, every thirty frames. The unit extractor 215 uses, for example, contour recognition to recognize the person, 404, the hat 412, the basketball 406, the basket 408 and the spectator 410. It will be appreciated that the objects recognized are based on the particular unit extractor 215 and the objects as drawn. For example, one unit extractor 215 may recognize basket 408 as a single unit, and another unit extractor 215 may recognize the pole as a first unit, the net as a second unit and the backboard as a third unit. However, the basket is being described as a single unit for simplicity. The frame selector 210 and unit extractor 215 perform similar methods on Frame 31 and on Frame 61.

The unit distinction engine 220 determines whether the units of one frame can be found and identified in the other frames. That is, the unit distinction engine 220 determines whether the basketball 406 can be found in Frame 31 or in Frame 61. By examining like attributes, the unit distinction engine 220 recognizes that person 404 and person 412 are instances of the same unit; that basketball 406, basketball 416 and basketball 424 are instances of the same unit; that hat 402, hat 414 and hat 426 are instances of the same unit, etc.

The unit predominance engine 225 computes the predominance factor for each of the units located. The unit predominance engine 225 recognizes two instances of a person 404/412, three instances of hat 402/414/426, one instance of spectator 410, three instances of basketball 406/416/424, three instances of basket 408/418/422, and one instance of birds 420. For simplicity, the predominance factor herein equals the number of instances of a unit. Accordingly, the predominance factor of person 404/412 is two, of hat 402/414/426 is three, of spectator 410 is one, of basketball 406/416/424 is three, of basket 408/418/422 is three, and of birds 420 is one. However, as stated above, the unit predominance engine 225 may apply size, contrast, uniqueness, and other variables to compute the predominance factors of the units.

The unit representation engine 230 determines the best representatives of the video sequence 400 from the units having the highest predominance factor. Assuming only two units per representative image 140, the unit representative engine 230 will select two units from the hat 408/414/426, the basketball 406/416/424 and the basket 408/418/422. As stated above, selection may be based on a review of previous and future video sequences 135 so that unique units can be selected. Upon review of FIG. 5, which illustrates a second example video sequence 135 of the video program, it can be seen that the unit representation engine 230 discards the basket 408/418/422 (since a basket also appears therein and thus does not uniquely represent the first example video sequence 400).

Figure 6B:
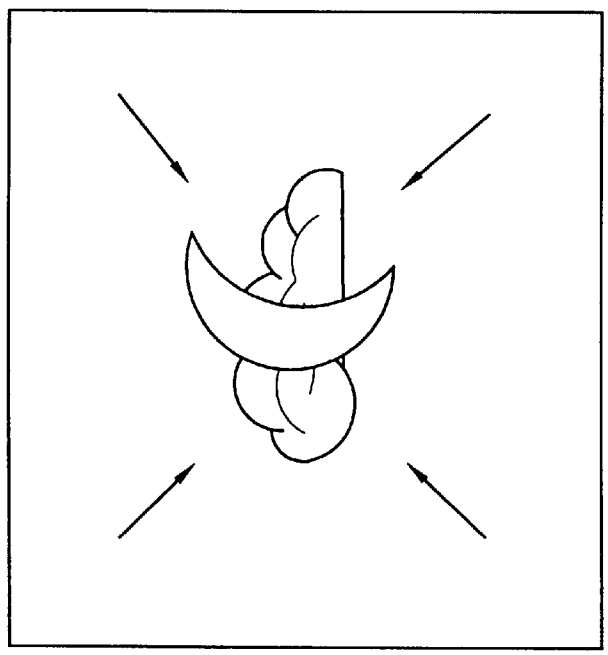
FIG. 6B illustrates a second example image representative of the second example video sequence.
Figure 6A:
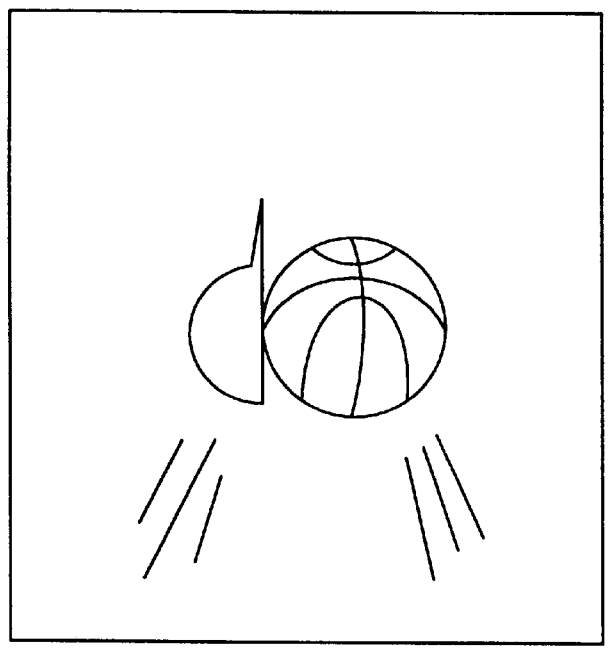
FIG. 6A illustrates a first example image representative of the first example video sequence.

The image engine 235 uses the selected two units, namely, the basketball 406/416/424 and the hat 402/414/426, to generate the image 140 representative of the video sequence 400. For example, based on its configuration, the image engine 235 may superimpose the hat on top of the basketball, may place the hat over the basketball, etc. Further, the enhancements module 245 of the image engine 235 may generate and include descriptive artwork to illustrate the apparent movement of the units across the frames. An example resulting representative image 140 representing the first example video sequence 400 is shown in FIG. 6A.

Figure 5:
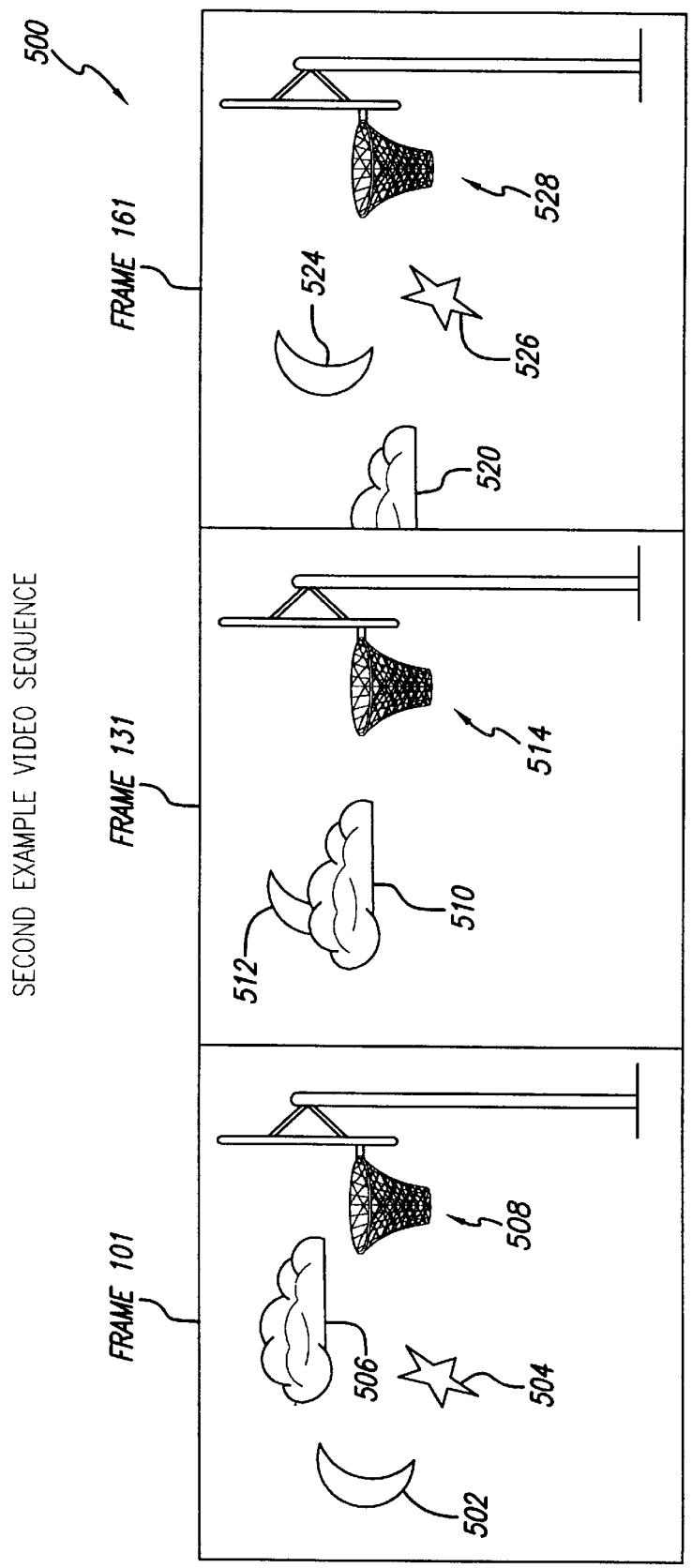
FIG. 5 illustrates a second example video sequence of FIG. 1.

FIG. 5 illustrates a second example video sequence 500 exemplifying a video sequence 135. Example video sequence 500 includes a first frame (Frame 101), a second frame (Frame 131) and a third frame (Frame 161). Frame 101 contains a moon 502, a star 504, a cloud 506 and a basket 508. Frame 131 contains a cloud 510, a partial moon 512 and a basket 514. Frame 161 contains a partial cloud 520, a moon 524, a star 526 and a basket 528. Using similar techniques as described with reference to FIG. 4, the unit predominance engine 225 determines that the predominance factors of the moon 502/512/524 is three, of the star 514/526 is two, of the cloud 506/510/520 is three, and of the basket 508/514/528 is three. The unit representation engine 230 discards the basket 508/514/528 and selects the moon and the cloud. The image engine 235 generates an image 140 using the cloud and the moon to represent the second example video sequence 500. The enhancements module 245 of the image engine 235 includes descriptive artwork in the representative image 140 to illustrate the disappearance of the cloud and the moon in some frames. An example representative image 140 representing the second example video sequence 500 is illustrated in FIG. 6B.

Figure 7:
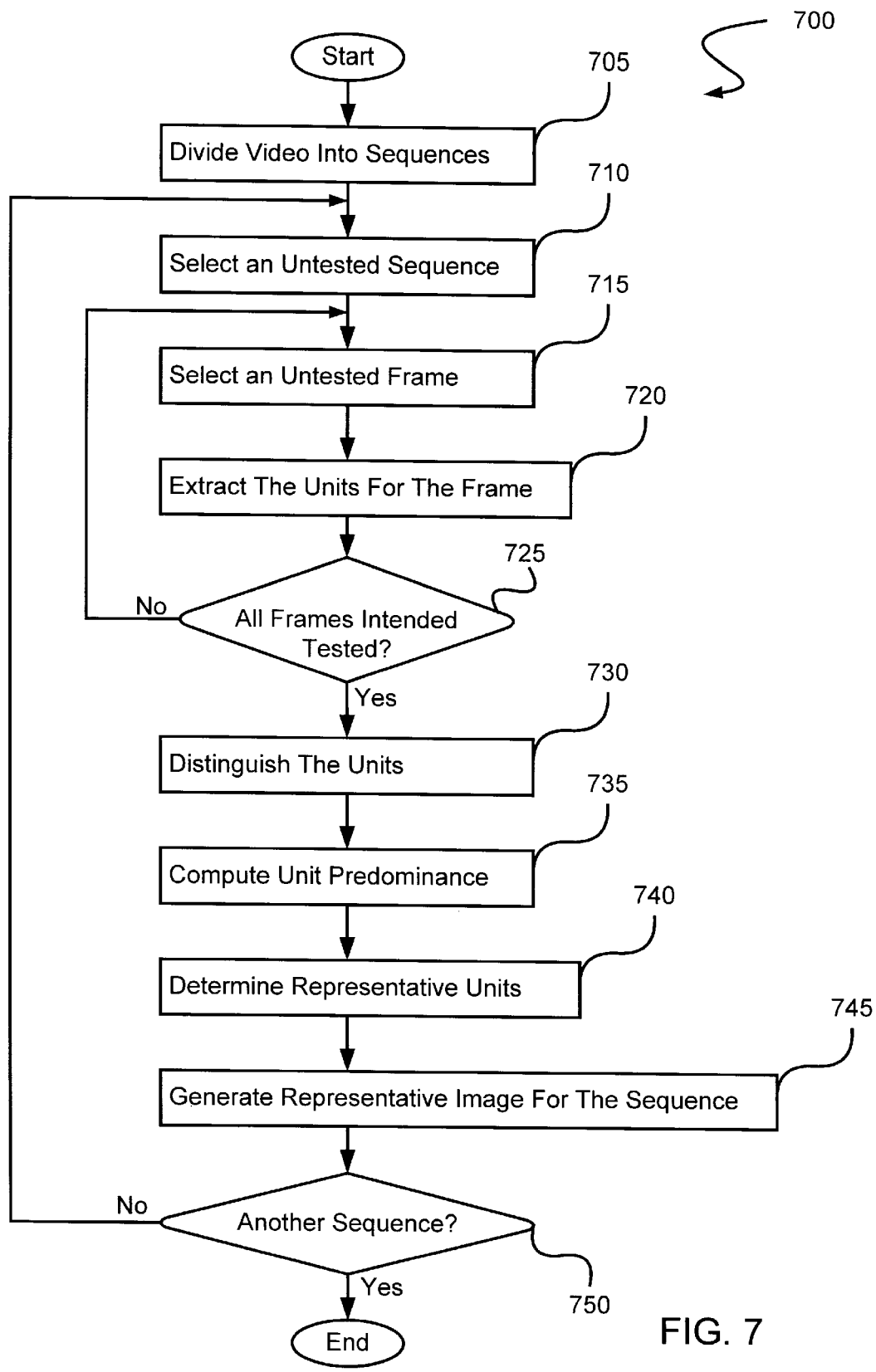
FIG. 7 is a flowchart illustrating a method for generating an image to represent a video sequence.

FIG. 7 is a flowchart illustrating a method 700 of generating an image 140 to represent a video sequence 135. Method 700 begins in step 705 with the sequence divider 205 dividing the video program into video sequences 135. Dividing a video into sequences can be performed using an index, noise identification, scene change analysis, etc. The frame selector 210 in step 710 selects an untested video sequence 135, and in step 715 selects an untested frame of the untested video sequence 135. Video sequence 135 and frame selection are preferably performed in a sequential manner. The unit extractor 215 uses techniques such as contour recognition, contrast, color and brightness analysis, etc. to locate units within each selected frame. It will be appreciated that the units extracted may differ based on the type of unit extractor 215 implemented. The frame selector 210 in step 725 determines whether all frames intended to be tested have been tested. For example, the frame selector 210 may be configured to select every thirtieth frame as an intended frame. If not, then method 700 returns to step 715 to select and extract units from the intended frames remaining in the selected video sequence 135.

After the frame selector 210 determines that all intended frames have been tested, the unit distinction engine 220 in step 730 distinguishes (i.e., extracts or resolves) the units between the frames in the selected video sequence 135. That is, the unit distinction engine 220 recognizes like units between frames. The unit predominance engine 225 in step 735 computes unit predominance, i.e., computes a predominance factor for each distinct unit. Computing a predominance factor may depend on the number of instances the unit appears in the sequence, the size of the unit in each frame, the brightness relative to other units in the frames, etc. The unit representation engine 230 in step 740 determines the units which best represent the sequence 135. For example, if a unit can be found in other video sequences 135, the unit may not be deemed sufficiently unique to identify the particular video sequence 135. In the preferred embodiment, the unit representation engine 230 selects the units having the highest predominance factor and from them locates the units that best represent the video sequence 135. Alternatively, the unit representation engine 230 in step 740 may prompt for user input to select the units that will represent the sequence.

The image engine 235 in step 745 uses the best representative units to generate a representative image 140. For example, the image engine 235 may superimpose the best representative units over one another. Alternatively, the image engine 235 may place them in order of appearance. Step 745 includes using an enhancements module 245 to add artwork to the representative image 140. The artwork may be representative of apparent movement of the units in the sequence or may be merely decorative. The frame selector 210 in step 750 then determines whether to test another video sequence 135, for example, by determining whether all video sequences 135 in the video program have been tested or by prompting a user for additional video sequence selection. If it is determined that another video sequence 135 should be tested, then method 700 returns to step 710 to select another untested video sequence 135. Otherwise, method 700 ends.

Figure 8:
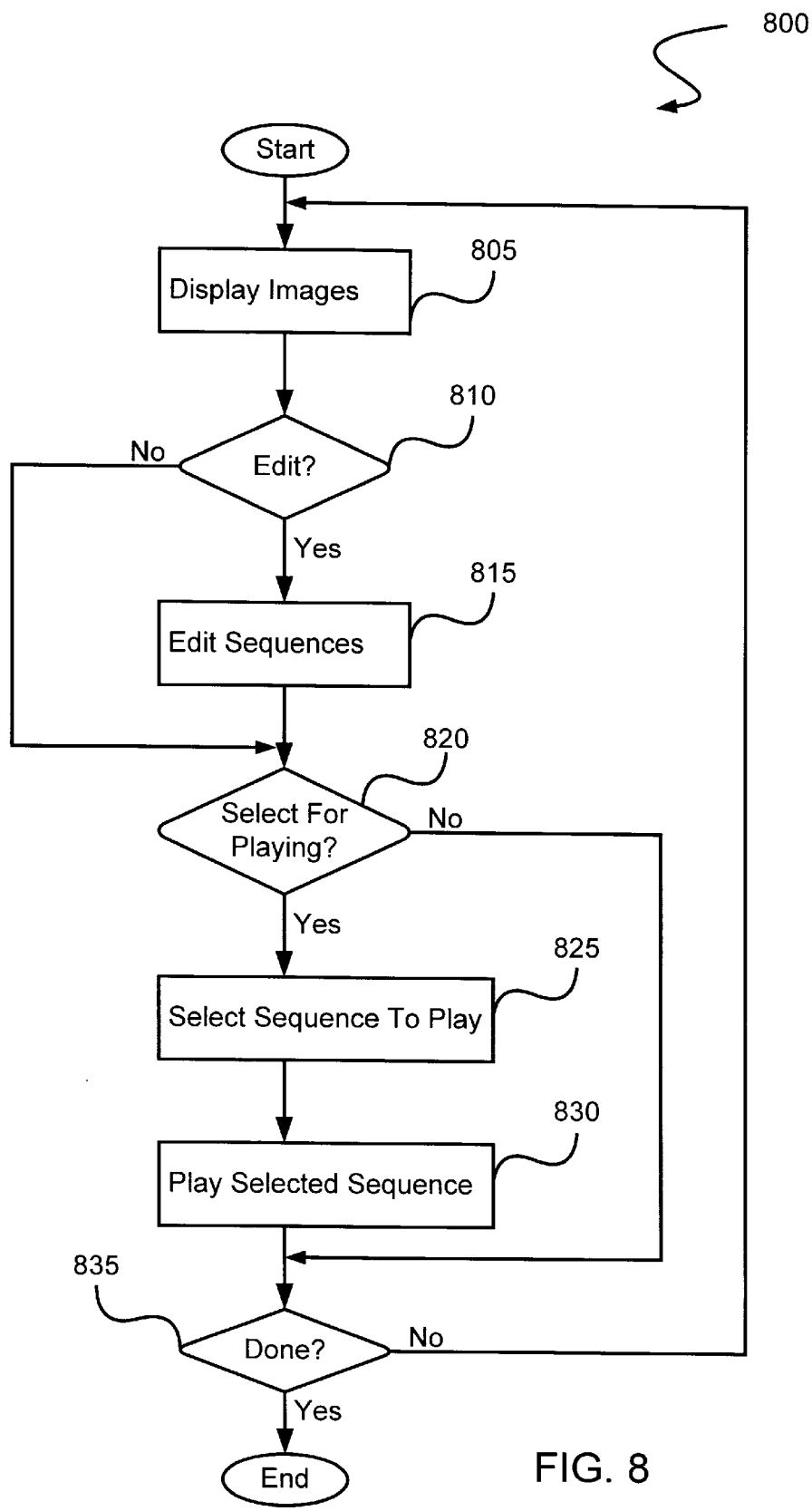
FIG. 8 is a flowchart illustrating a method for editing a video sequence to play.

FIG. 8 is a flowchart illustrating a method 800 for editing and performing video sequences 135. Method 800 begins in step 805 with the representative image viewer 305 displaying the representative images 140. The sequence editor 310 in step 810 determines whether an edit request has been received. If not, then method 800 jumps to step 820. Otherwise, the sequence editor 310 in step 815 enables the editing of the video sequences 135, preferably, by enabling the user to re-order, delete, duplicate, etc. the representative images 140 which causes the corresponding re-ordering, deletion, duplication, etc. of the video sequences 135 in the video program. Similarly, the sequence editor 310 enables the user to re-order, delete, duplicate, etc. video subsequences 135 within each video sequence 135. After editing the video sequences 135, method 800 proceeds to step 820.

In step 820, the sequence selector 315 enables a user to request video performance. If a performance request is not received, then method 800 jumps to step 835 to determine whether the user is done. If so, then method 800 ends. Otherwise, method 800 returns to step 805. If in step 820 a performance request is received, then the sequence selector 315 in step 825 enables the selection of representative images 140, which indirectly enables the selection of video sequences 135 to perform. The video performer 320 in step 830 performs the selected video sequences 135. Method 800 then proceeds to step 835 to determine whether the user is done.

Figure 9:
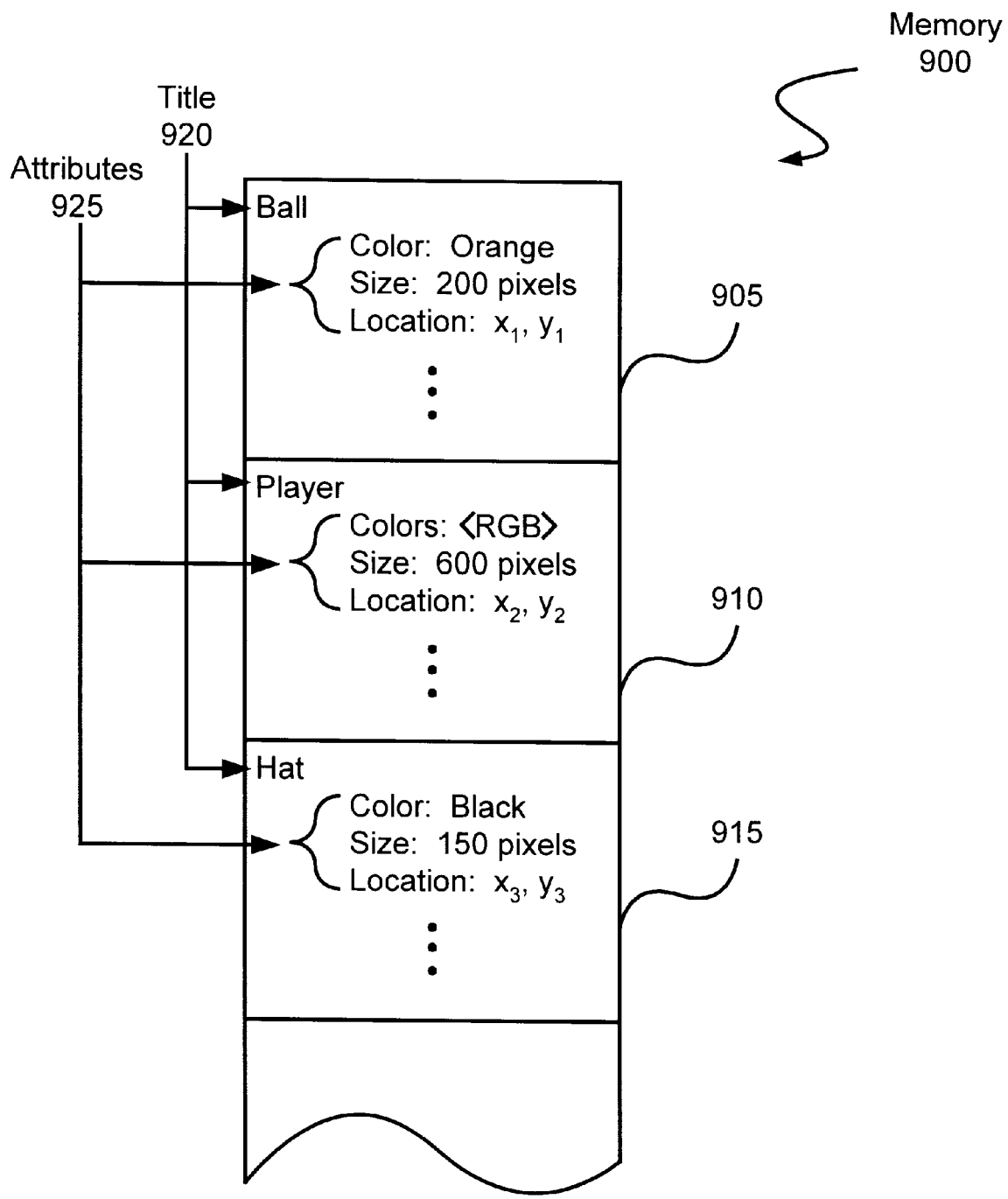
FIG. 9 is a block diagram illustrating an example memory storing frame units.

FIG. 9 is a block diagram illustrating an example memory 900 storing the units located in Frame 1 of FIG. 4. The unit extractor 215 stores a title 920 for each unit and corresponding attributes 925 in memory 900. For example, a first portion 905 of memory 900 stores a title ("Ball") for a first unit, and corresponding attributes 925 including color ("Orange"), size ("200 pixels") and location ("x1,y1"). A second portion 910 of memory 900 stores a title ("Player") for a second unit, and corresponding attributes 925 including a list of RGB color values ("<RGB>"), size ("600 pixels") and location ("x2,y2"). A third portion 915 of memory 900 stores a title ("Hat") for a third unit, and corresponding attributes 925 including color ("Black"), size ("150 pixels") and location ("x3,y3"). Other attributes such as shape, brightness, contrast, etc. (not shown) for each unit may also be listed in memory 900. Color, shape, size and location may also be stored in other ways.

The unit distinction engine 220 may use the attributes 925 to resolve other instances of each unit in other frames. The unit predominance engine 225 may use the attributes 925 to compute the predominance factor for each unit. The image engine 235 may use the attributes 925 to generate the representative image 140.

The foregoing description of the preferred embodiments of the present invention is by way of example only, and other variations and modifications of the above-described embodiments and methods are possible in light of the foregoing teaching. Components of this invention may be implemented using a programmed general purpose digital computer, using application specific integrated circuits, or using a network of interconnected conventional components and circuits. The embodiments described herein are not intended to be exhaustive or limiting. The present invention is limited only by the following claims.

What is claimed is:

1. A system for automatically generating an image to represent a video sequence, comprising:
   a sequence divider for dividing a video program into one or more video sequences;
   a selector coupled to the sequence divider for selecting a sequence from the one or more video sequences;
   a unit extractor coupled to the selector for resolving units in a frame of the selected video sequence;

a unit distinction engine coupled to the unit extractor for determining distinct units from the units resolved by the unit extractor;

a unit predominance engine coupled to the unit distinction engine for defining predominance of each of the distinct units, wherein predominance is determined according to at least one of the group of an attribute of each distinct unit and the number of instances of each distinct unit; and an image engine coupled to the unit predominance engine for generating an image representative of the selected video sequence based on the predominance of the distinct units.

2. The system of claim 1, further comprising a unit representation engine coupled to the unit distinction engine for determining the distinct units which most uniquely represent the selected video sequence.

3. The system of claim 2, wherein the unit representation engine determines uniqueness by examining a previous video sequence.

4. The system of claim 2, wherein the unit representation engine determines uniqueness by examining a subsequent video sequence.

5. The system of claim 2, wherein the image engine generates an image representative of the selected video sequence based on the distinct units determined by the unit representation engine to represent the selected video sequence most uniquely.

6. The system of claim 1, wherein the image engine includes an enhancement module for adding enhancements to the representative image.

7. A computer-based method for automatically generating an image to represent a video sequence, comprising:

dividing a video program into one or more video sequences;

selecting a sequence from the one or more video sequences;

resolving units in a frame of the selected video sequence;

determining distinct units from the resolved units with a unit distinction engine;

defining predominance of each of the distinct units, wherein predominance is determined according to at least one of the group of an attribute of each distinct unit and the number of instances of each distinct unit; and generating an image representative of the selected video sequence based on the predominance of the distinct units.

8. The method of claim 7, further comprising, before generating an image, the step of enabling user selection of the predominance of the distinct units.

9. The method of claim 7, further comprising determining the distinct units which most uniquely represent the selected video sequence.

10. The method of claim 9, wherein determining the distinct units further includes determining uniqueness by examining a previous video sequence.

11. The method of claim 10, wherein determining the distinct units further includes determining uniqueness by examining a subsequent video sequence.

12. The method of claim 10, wherein the generating an image representative of the selected video sequence is based on determining the distinct units to represent the selected video sequence most uniquely.

13. The method of claim 7, wherein generating an image further includes adding enhancements to the representative image.

14. A data signal embodied in a carrier wave for causing a processor to perform the steps of:

dividing a video program into one or more video sequences;

selecting a sequence from the one or more video sequences;

resolving units in a frame of the selected video sequence;

determining distinct units from the resolved units with a unit distinction engine;

defining predominance of each of the distinct units, wherein predominance is determined according to at least one of the group of an attribute of each distinct unit and the number of instances of each distinct unit; and generating an image representative of the selected video sequence based on the predominance of the distinct units.

* * * * *